United States Patent
Peir et al.

(10) Patent No.: US 6,711,662 B2
(45) Date of Patent: Mar. 23, 2004

(54) MULTIPROCESSOR CACHE COHERENCE MANAGEMENT

(75) Inventors: Jih-Kwon Peir, Gainesville, FL (US); Konrad Lai, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 09/823,251

(22) Filed: Mar. 29, 2001

(65) Prior Publication Data

US 2002/0144063 A1 Oct. 3, 2002

(51) Int. Cl.[7] ............................................. G06F 12/00
(52) U.S. Cl. .................. 711/204; 711/124; 711/137; 711/145
(58) Field of Search ................. 711/124, 141, 711/144, 145, 156, 165, 204, 205, 213, 137

(56) References Cited

U.S. PATENT DOCUMENTS

| | | | |
|---|---|---|---|
| 5,752,258 A | * | 5/1998 | Guzovskiy et al. .......... 711/120 |
| 6,052,760 A | * | 4/2000 | Bauman et al. ............. 711/119 |
| 6,108,737 A | * | 8/2000 | Sharma et al. ............. 710/107 |
| 6,151,663 A | * | 11/2000 | Pawlowski et al. ......... 711/147 |
| 6,341,334 B1 | * | 1/2002 | Kamemaru ................. 711/137 |
| 6,449,696 B2 | * | 9/2002 | Okayasu ..................... 711/137 |

OTHER PUBLICATIONS

Markatos, Evangelos P., et al., "A Top–10 Approach to Prefetching on the Web", Institute for Computer Science, Aug. 1996.*

*Alternative Implementations of Two–Level Adaptive Branch Prediction* by Tse–yu Yeh and Yale N. Patt, Department of Electrical Engineering and Computer Science, University of Michigan; published at the 19th Annual International Symposium on Computer Science.

* cited by examiner

Primary Examiner—Gary Portka
(74) Attorney, Agent, or Firm—Fish & Richardson P.C.

(57) ABSTRACT

A shared-memory system includes processing modules communicating with each other through a network. Each of the processing modules includes a processor, a cache, and a memory unit that is locally accessible by the processor and remotely accessible via the network by all other processors. A home directory records states and locations of data blocks in the memory unit. A prediction facility that contains reference history information of the data blocks predicts a next requester of a number of the data blocks that have been referenced recently. The next requester is informed by the prediction facility of the current owner of the data block. As a result, the next requester can issue a request to the current owner directly without an additional hop through the home directory.

25 Claims, 4 Drawing Sheets

MULTIPROCESSOR CACHE COHERENCE MANAGEMENT

TECHNICAL FIELD

This invention relates to multiprocessor cache coherence management.

BACKGROUND

Referring to FIG. 1, a shared-memory multiprocessor system 10 includes processing modules 12 connected to an interconnection network 14. Each processing module 12 includes a processor 121 and a cache 122, which is a fast memory directly accessible to the associated processor 121 in the same processing module 12. Cache 122 holds copies of data that have been recently accessed, and are likely to be accessed soon by its associated processor 121. Before a processor 121 reads a data block, the processor first goes to its cache 122 to see if the data block has already been placed there. If the data block is not in its cache 122, called a cache miss, or the data block is not valid, the processor must retrieve the data block from either a local or remote memory unit 16 through the interconnection network 14. The interconnection network 14 is typically a bus or a general Local Area Network (LAN) that delivers data to its destination according to a destination address sent with the data. An I/O controller 18, also connected to the interconnection network 14, serves as an I/O interface to various types of I/O devices.

The multiprocessor system 10 includes memory units 16, each coupled to, or associated with, one of the processing modules 12. The memory units 16 are shared by all of the processors 121, that is, every processor 121 can read from or write to any of memory units 16. However, only the processor 121 associated with, i.e., locally connected to, a memory unit 16 has local access to that memory unit; all the other processors 121 have to access it remotely through the interconnection network 14.

DETAILED DESCRIPTION

Figure 1:
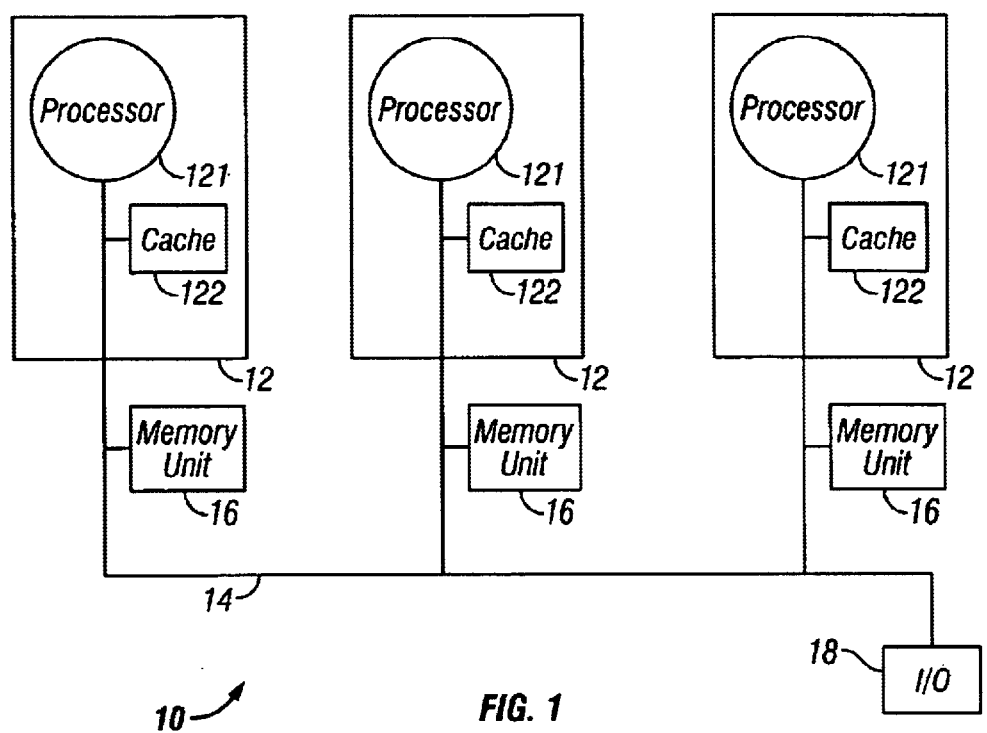
FIG. 1 shows a shared-memory multiprocessor system.
Figure 2:
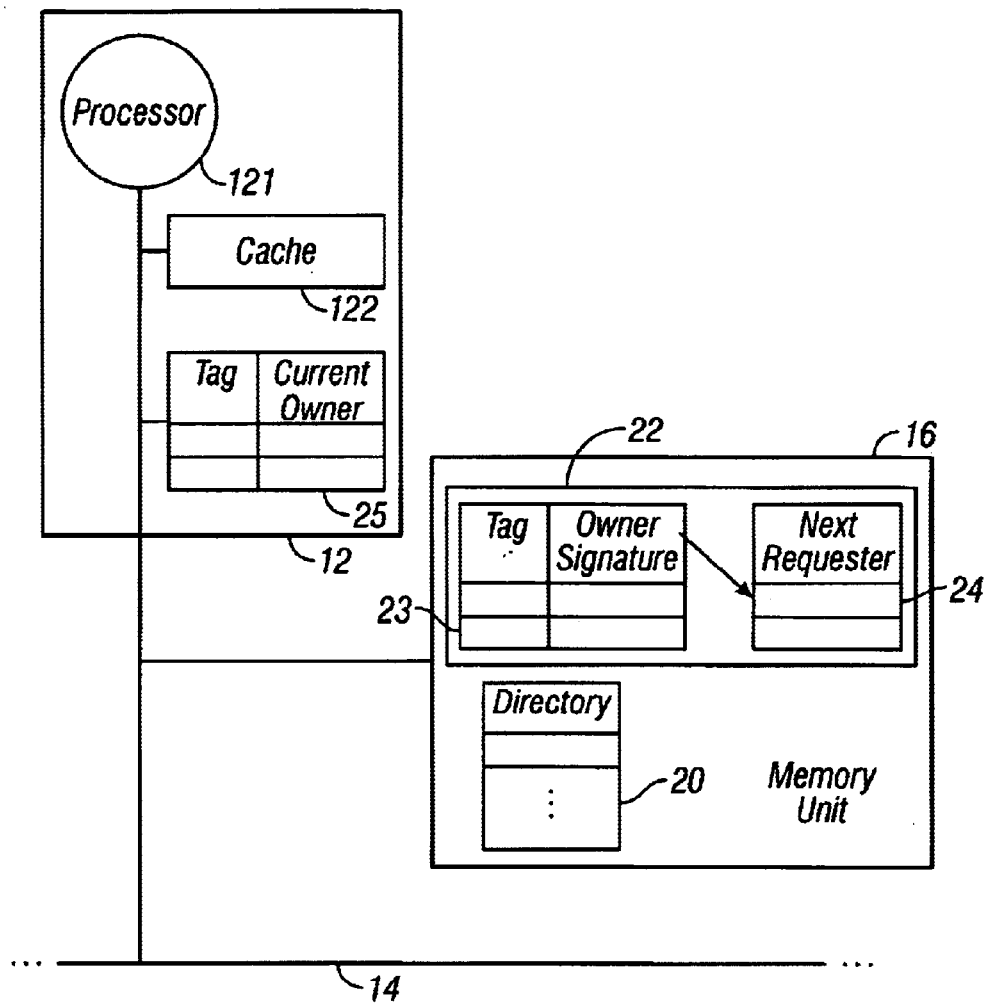
FIG. 2 illustrates components of a cache for predicting next requesters.

In multiprocessor system 10, due to data sharing among multiple processors, copies of a data block in any of the memory units 16 may be stored in multiple caches 122. In order to capture spatial locality of memory references, each copy of the data block is normally allocated and de-allocated as a continuous block in the cache 122, called a cache line. The processor 121 can independently read or modify the values of the copy in its cache 122 at any given time. To assure cache coherence, information about at least a portion of data blocks in the memory unit 16 is recorded and stored in a directory 20, which is also located in that memory unit (FIG. 2). The use of the directory 20 to store information about data blocks is known in the art. In one scenario, the directory 20 can store information about all data blocks in the memory unit 16 in which the directory resides. Alternatively, the directory 20 can store only the data blocks that have been copied to at least one of the caches 122. The information stored in the directory 20 generally includes the caches 122 that contain the data block, and, if any, the one cache that owns the most recently updated copy of the data block, called the current owner of the data block.

Referring to FIG. 2, the directory 20 is called a home directory 20 of the data block that resides in the one memory unit 16 where a persistent copy of the data block is stored. When a processor 121 inquires of the home directory 20 for a current owner of a data block, the home directory will use built-in search logics (not shown) to search the stored information about the data block.

Because more than one cache may contain a cache line storing a copy of a data block, in one scenario, each processor 121 ensures that the content of a cache line is current before it reads the cache line from its cache 122. The content of the cache line of the cache 122 is not current if another processor has already modified the corresponding data block. As a result, the content of the cache line is rendered invalid. Among the copies of the data block in caches 122 and the data block in memory unit 16, only the one with the most current content is valid. Typically, every cache line of cache 122 is tagged to indicate its validity state, and whether or not the associated processor 121 of the cache is the sole owner of the cache line.

When a processor 121 retrieves a cache line from its local cache 122, it checks the validity state of the cache line first. If the state indicates that the cache line is valid, the processor can read the cache line. If the cache line is missing or invalid in its local cache 122, the processor 121 has to send a request to the home directory 20 of the requested data block. The request locates the valid cache line for the processor 121 to perform a read operation. If the processor 121 is the sole owner of the cache line, it can also write to the cache line. To become the sole owner of the cache line, the processor 121 can send a request to the home directory of the corresponding data block to invalidate all other copies. The home directory 20 thus maintains the states and locations of data blocks in memory units 16. Therefore, the processor 121 can locate a current owner by sending an inquiry to the home directory 20 as is known in the art. However, sending the inquiry to the home directory 20, also known as a hop, is required for the processor 121 to send the inquiry. The hop increases delays for the processor 121 to retrieve data from the current owner.

As will be described in detail below, in one scenario, the processor 121 can obtain a current copy of the data block without inquiring of the home directory 20 by using predictions. The predictions allow a processor 121 to obtain the most current content of a data block directly from the current owner, thereby accelerating read operations performed by the processor.

In the above scenario, the processor 121, also called the next requester, can retrieve the data from the current owner of the data directly if information about the current owner is available at the processor. A processor 121 is called the next requester for a data block if it is not the current owner of the data block, and will read or write the data block before any other processors that are not the current owner.

To provide the current owner information to the next requester, a prediction facility 22 is established at each memory unit 16. The prediction facility 22 exchanges ownership information with the home directory 20 located in the same memory unit 16, and makes predictions about the next requester of a give data block of its memory unit 16 whenever one of the processors 121 claims new ownership to the data block. The prediction facility 22 also records the history of requesters for data blocks in memory unit 16 that have been recently requested.

The prediction facility 22 makes a prediction on a next requester of a data block according to ownership history of the data block. For example, the predicted next requester can be the previous owner of a data block. Such a prediction is best used when two processors alternate the ownership of the data block. In this example, the history can simply be the last owner. The history can be stored in the home directory 20 or in the prediction facility 22 in the form of a prediction table indexed by the address of the data block.

The history of ownership can include more than one past owner, for example, a sequence of past owners. Referring again to FIG. 2, in one embodiment, the prediction facility 22 uses a prediction table, including a first-level table 23 for storing the history of ownership, and a second-level table 24 for storing predicted next requesters. The first-level table 23 and the second-level table 24 reside in the prediction facility 22. For each recently-referenced data blocks in its memory unit 16, first-level table 23 includes a line tag, i.e., the address of a data block, and a sequence of recent owners. The sequence of recent owners forms an owner signature. According to the owner signature, a data block in each entry of the first-level table 23 points to a predicted next requester in the second-level table 24.

For example, in a multiprocessor system with eight processors, three bits are used to indicate each of the processors. The owner signature, in this case, can be a sequence of three owners, and therefore contains nine bits. The second-level table 24 will have $2^9$ lines, with each line storing a predicted next requester, identified by three bits representing one of the eight processors.

In certain scenarios, a data block can be accessed by a single writer and multiple readers. The next requester in these scenarios can be extended to include a small set of processors, because any of the multiple readers can be the next requester. Predicting more than one next requester in these scenarios can improve prediction accuracy.

According to the predictions, the prediction facility 22 of the memory unit 16 informs the predicted next requester about the current owner of the data block. The prediction facility 22 makes a prediction for a data block whenever a new owner of the data block is identified. The new owner is identified when it claims ownership of the data block at the associated home directory 20. The prediction facility 22 is sent to the predicted next requester via the interconnection network 14. The current owner information is stored in a current-owner table 25 at the next requester. The current-owner table 25 can be stored in the cache 122, or in a memory separate from the cache 122. The current-owner table 25 is generally a small table that stores a number of current owners, each for a data block to which the next requester is predicted to access.

When a processor 121 needs to use a data block, it first checks its own cache 122. If the data block is not in that cache 122, or is in the cache but has been invalidated by another processor, the processor 121 checks the current owner table 25 for that data block. If the processor 121 finds the current owner of the data block it intended to use from the current-owner table 25, the processor will request the data block directly from the current owner.

Before the processor 121 retrieves the data block from the current owner, to assure that nothing has happened to affect the validity of the data block, the processor 121 sends an inquiry to the home directory 20 in parallel with the request that the processor sends to the current owner. If the data block at the current owner has been invalidated by the time the processor 121 reaches there, the processor 121 will locate the actual current owner from the home directory 20, as if the prediction had not happened. The home directory 20 will not respond to the parallel inquiry if it confirms that the current owner is correct.

If another processor 121, rather than the predicted processor, is the next requester for the data block, the prediction is incorrect. In this situation, the other processor 121 can inquire in the home directory 20 for the current owner, and then request the data block from the current owner. From the perspective of the other processor 121, the incorrect predication does not impose any penalty, except for a potential minor increase in traffic on interconnection network 14, due to information sent to the incorrectly predicted processor 121. From the perspective of the incorrectly predicted processor 121, information about the data block in its current-owner table 25 is not correct. However, because the predicted processor 121 does not request for the data block, the incorrect information will not be used. In one scenario, the home directory 20 of the data block can invalidate the incorrect information, once it receives the inquiry from the other processor 121 for the data block. The invalidation prevents the incorrect information from being read. In another scenario, the incorrect information can stay in the current-owner table 25, and will be replaced by other predictions later. Generally, the replacement happens quickly because the current-owner table 25 contains only a few entries and first-in entries are dropped first from the table. With the parallel inquiry to the home directory 20 as described above, an incorrect prediction is no worse than no prediction except for the slight increase in traffic.

The copy of the data block stored at the current owner can be pre-fetched before the predicted next requester requests it. The combination of prediction and pre-fetching further increase data access speed and throughput, because the requested data will be available at the predicted next requester when the next requester needs it.

Figure 3A:
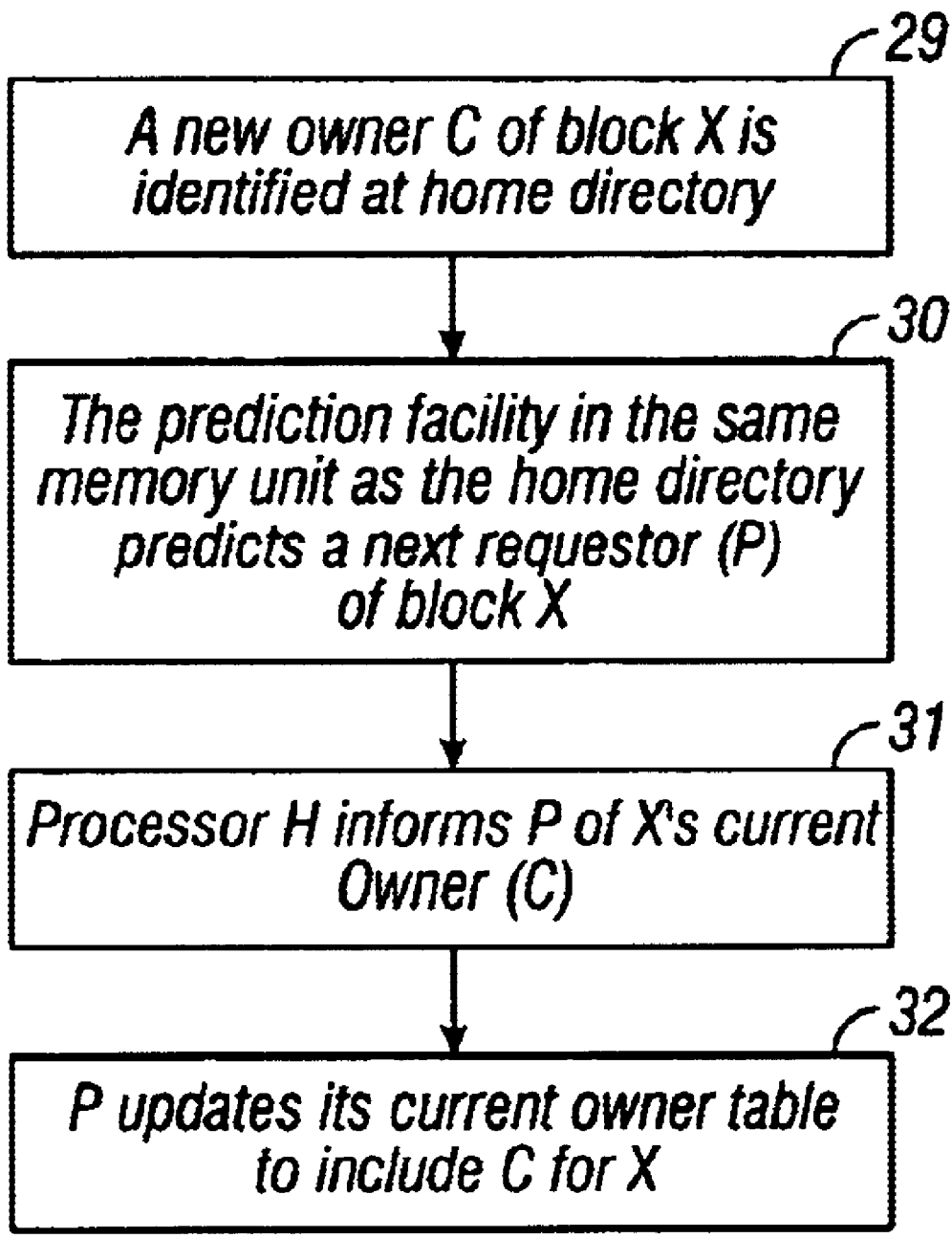
FIG. 3A is a flow diagram of a process of the predictions.

Referring to FIG. 3A, a flow diagram illustrates the process of prediction. When a processor 121 claims ownership to a data block (e.g., data X), the home directory 20 of the data block identifies the processor as the current owner of data X (step 29). The prediction facility 22, located in the same memory unit 16 as the home directory 20, predicts data X's next requester based on the history of data X's past owners (step 30). As a result, processor P (the "Predicted") is predicted. The prediction facility 22 informs processor P of data X's current owner, for example, processor C (the "Current") (step 31). Processor P then updates its current owner-table 25 to include data X and processor C (step 32).

Figure 3B:
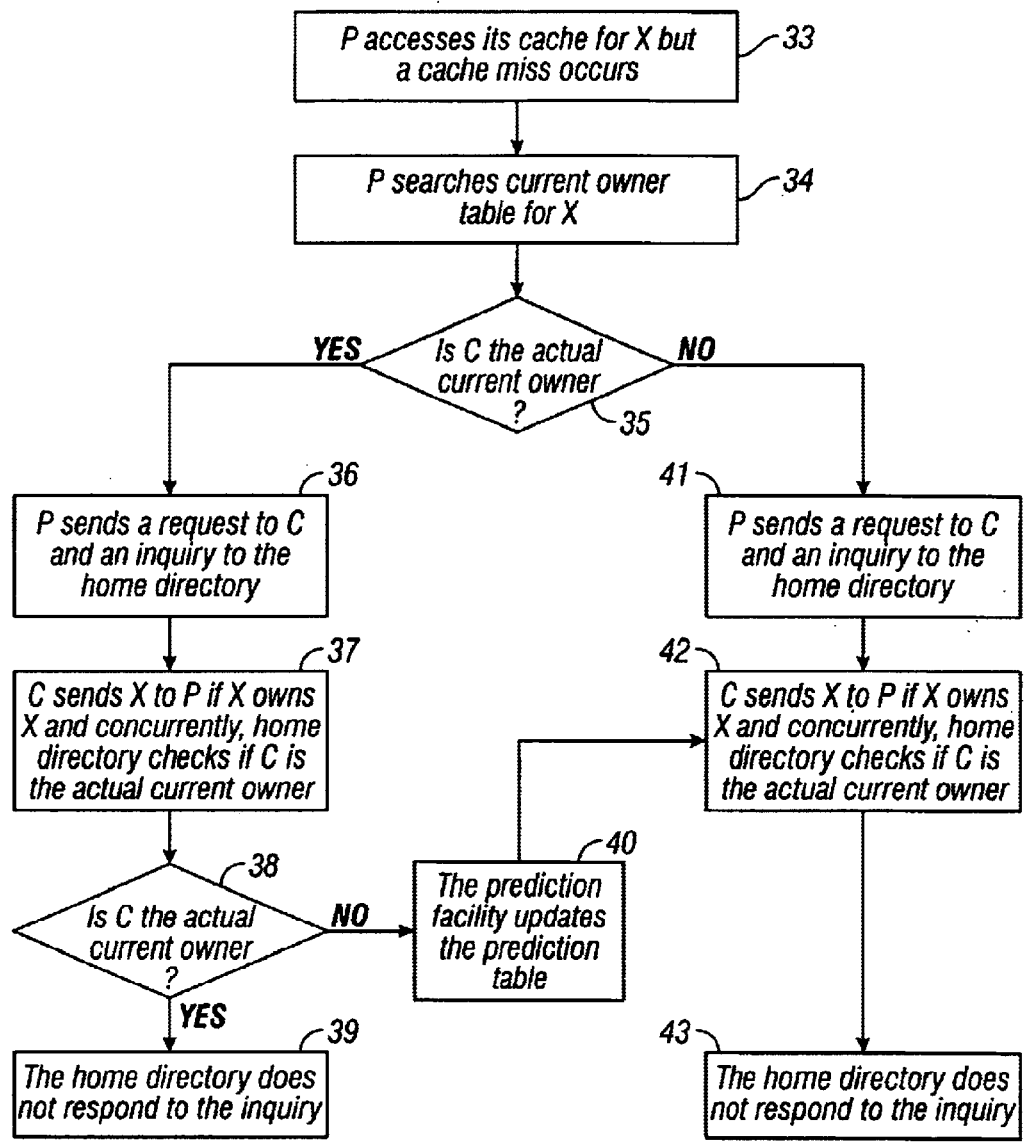
FIG. 3B is a flow diagram of a process for locating a current owner of a data block.

Referring to FIG. 3B, when processor P accesses its cache 122 for data X but a cache miss occurs (step 33), processor P searches the current-owner table 25 for data X (step 34). If processor P finds data X and the corresponding current owner C (step 35), processor P sends a request to processor C and an inquiry to the home directory 20 to verify that processor C is the actual current owner (step 36). Processor C responds to the request by sending data X back to processor P if processor C owns data X, and concurrently, home directory 20 checks if processor C is the actual current owner (step 37). If processor C is indeed the actual current owner (step 38), the home directory 20 will not respond to the inquiry; otherwise, the prediction facility 22 updates the prediction table to reflect the ownership of data X (step 40). The home directory 20 routes the request to the current owner of data X (step 42), and the current owner returns data X to processor P and home directory 20 (step 43).

If at step 35, processor P does not find the current owner of data X in the current-owner table 25, processor P sends a request to home directory 20 (step 41). The home directory 20 routes the request to the current owner of data X (step 42). The current owner returns data X to processor P and the home directory 20 (step 43).

The predictions can be used with an interconnection network 14 that does not preserve order of transmissions. On such a network 14, a processor on such a network 14 may observe messages being transmitted in an order different from what is observed by another processor. Specifically, home directory 20 may receive requests for the same data block from multiple processors 121 at substantially the same time, but the order of receipt may not be the same as the actual order of the requests. The uncertainty of the actual order of the requests creates uncertainties in results produced by processing system 10. For example, a read after a write will most likely produce a different result from a write after a read. In such situations, however, uncertainties of transmission order does not affect the predictions as described above, because the home directory 20 of a given data block can serve as a serialization point. The home directory 20 can overwrite any outstanding predictions with respect to the data block, and continue request processing without the predictions. The predictions can be resumed at a later time.

Other embodiments are within the scope of the following claims.

What is claimed is:

1. A method comprising:
   predicting a next requester of a data block from among processors in a processing system that includes a memory in which the data block is stored, the next requester being one of the processors that is expected to read or write the data block before any other processors that are not a current owner; and
   informing the predicted next requester of the current owner of the data block, the current owner being one of the processors that owns the most recently updated copy of the data block.

2. The method of claim 1 further comprising maintaining a history of ownership and basing the predicting on the history of ownership.

3. The method of claim 2 wherein maintaining the history of ownership includes recording a last owner of the data block.

4. The method of claim 2 wherein maintaining the history of ownership includes recording a sequence of past owners of the data block.

5. The method of claim 1 further comprising overwriting information at the predicted next requester when an uncertainty arises about the current owner.

6. The method of claim 1 wherein predicting a next requester is performed when one of the processors claims ownership to the data block.

7. A method comprising:
   receiving, as a predicted next re ester of a data block, information about a current owner of the data block, the current owner being a processor in a processing system that includes a memory in which the data block is stored; and
   requesting the data block directly from the current owner; and
   receiving the data block from the current owner.

8. The method of claim 7 wherein the requesting of the data block occurs before a processor other than the current owner determines to use the data block.

9. The method of claim 7 wherein the requesting of the data block takes place when a processor other than the current owner determines to use the data block.

10. The method of claim 7 wherein the requesting of the data block is made in parallel with inquiring for information about a subsequent current owner.

11. The method of claim 7 further comprising storing the information about the current owner in a cache.

12. A cache management system comprising:
   a network;
   processors configured to communicate with each other through the network;
   caches, each directly accessible by one of the processors; and
   memory units, each being locally accessible by one of the processors and remotely accessible by all other processors, the memory units each including data identifying a predicted next requester of a data block and a directory adapted to store information for predicting the next requester of the data block for which the directory comprises a home directory.

13. The system of claim 12 wherein the information included in the directory comprises a history of ownership.

14. The system of claim 13 wherein the history of ownership includes a previous owner of the data block.

15. The system of claim 13 wherein the history of ownership includes a sequence of past owners of the data block.

16. The system of claim 13 wherein the memory includes a first table for storing the information for the prediction and a second table for storing the data identifying the next requester of the data block.

17. The system of claim 12 wherein the caches each further includes a table for storing a current owner of a data block that is predicted to be used by the processor that directly accesses the one cache.

18. The system of claim 12 wherein the home directory to a data block is a serialization point for that data block.

19. A computer program product residing on a computer readable medium comprising instructions for causing a computer to:
   predict a next requester of a data block from among processors in a processing system that includes a memory in which the data block is stored, the next requester being one of the processors that is expected to read or write the data block before any other processors that are not a current owner; and
   inform the predicted next requester of the currant owner of the data block, the current owner being one of the processors that owns the most recently updated copy of the data block.

20. The computer program product of claim 19 further comprising instructions for causing a computer to maintain a history of ownership and to base the predicting on the history of ownership.

21. The computer program product of claim 20 wherein maintaining the history of ownership includes recording a last owner of the data block.

22. The computer program product of claim 20 wherein maintaining the history of ownership includes recording a sequence of past owners of the data block.

23. The computer program product of claim 19 further comprising instructions for causing a computer to overwrite information at the predicted next requester when an uncertainty arises about the current owner.

24. The method of claim 1 wherein predicting the next requester comprises predicting the next requester of the data block from among processors in the processing system that includes a cache in which the data block is stored.

25. The method of claim 7 wherein receiving information about the current owner of the data block comprises receiving information about the processor in the processing system that includes a cache in which the data block is stored.

* * * * *